United States Patent [19]
Chartrand

[11] Patent Number: 5,469,628
[45] Date of Patent: Nov. 28, 1995

[54] APPARATUS FOR MEASURING THE DEFORMATION OF DAMAGED VEHICLES AND FOR RECONSTRUCTING CRIME SCENES

[75] Inventor: François Chartrand, 1009, Route 202, Godmanchester R.R. 4, Huntingdon, Québec, Canada, J0S 1H0

[73] Assignee: François Chartrand, Huntingdon, Canada

[21] Appl. No.: 375,597

[22] Filed: Jan. 20, 1995

Related U.S. Application Data

[63] Continuation of Ser. No. 41,396, Mar. 31, 1993, abandoned.

[51] Int. Cl.$^6$ .................................................. G01B 5/02
[52] U.S. Cl. ............................................ 33/608; 33/288
[58] Field of Search ............................... 33/288, 600, 608

[56] References Cited

U.S. PATENT DOCUMENTS

| | | |
|---|---|---|
| 4,498,242 | 2/1985 | Celette .................................. 33/600 |
| 4,507,872 | 4/1985 | Shermann ............................ 33/600 X |
| 4,561,187 | 12/1985 | Powell .................................. 33/288 |
| 4,719,704 | 1/1988 | Hog ....................................... 33/288 |
| 4,771,544 | 9/1988 | Riutta ................................ 33/288 X |
| 4,939,848 | 7/1990 | Armstrong ............................. 33/608 |
| 5,029,397 | 7/1991 | Palombi ................................ 33/288 |
| 5,343,628 | 9/1994 | Harn ..................................... 33/608 |

FOREIGN PATENT DOCUMENTS

| | | |
|---|---|---|
| 1145929 | 5/1983 | Canada . |
| 1295127 | 2/1992 | Canada . |
| 2604779 | 4/1988 | France ................................... 33/608 |
| 0148002 | 11/1981 | Japan ..................................... 33/608 |

OTHER PUBLICATIONS

Accident Reconstruction Journal vol. 4, No. 5, Sep/Oct. 1992, pp. 1–56.

*Primary Examiner*—Alvin Wirthlin

[57] ABSTRACT

An apparatus for measuring on the site of an accident the three-dimensional deformation of a damaged vehicle comprises a reference frame and a distance measuring device. The reference frame comprises a first straight frame portion installed in front of the vehicle parallel to the transversal axis thereof, a second elongated straight frame portion installed on the side of the vehicle parallel to this vehicle's longitudinal axis, and a third elongated straight frame portion installed at the rear of the vehicle parallel to the transversal axis. When the deformation is situated in front of the damaged vehicle, the first frame portion defines a first axis of a three-dimensional coordinate system, the second axis of this coordinate system being located in a vertical plane in which the first elongated frame portion is lying. The distance measuring device measures distances between the first frame portion and the body of the damaged vehicle in the region of the three-dimensional deformation, by measuring distances along the second and a third axis of the three-dimensional coordinate system. The distance measurements along with knowledge of the spatial relationship between the first frame portion and the non deformed part of the vehicle body give very accurate information about the three-dimensional deformation of the vehicle.

7 Claims, 6 Drawing Sheets

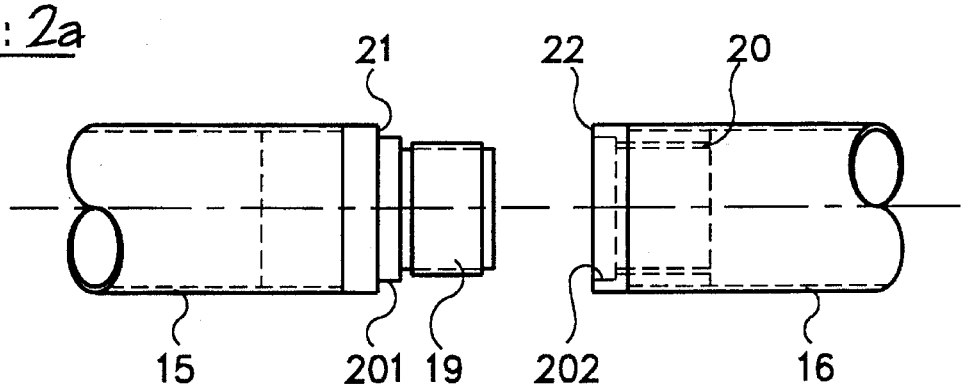
FIG: 2a
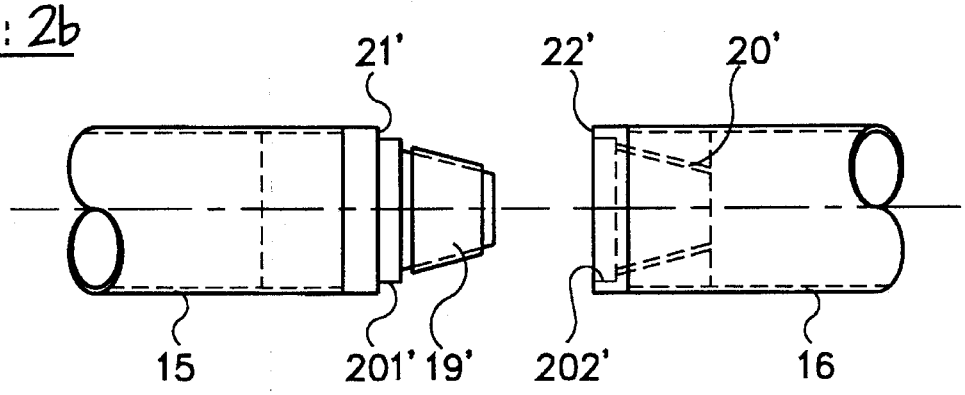
FIG: 2b
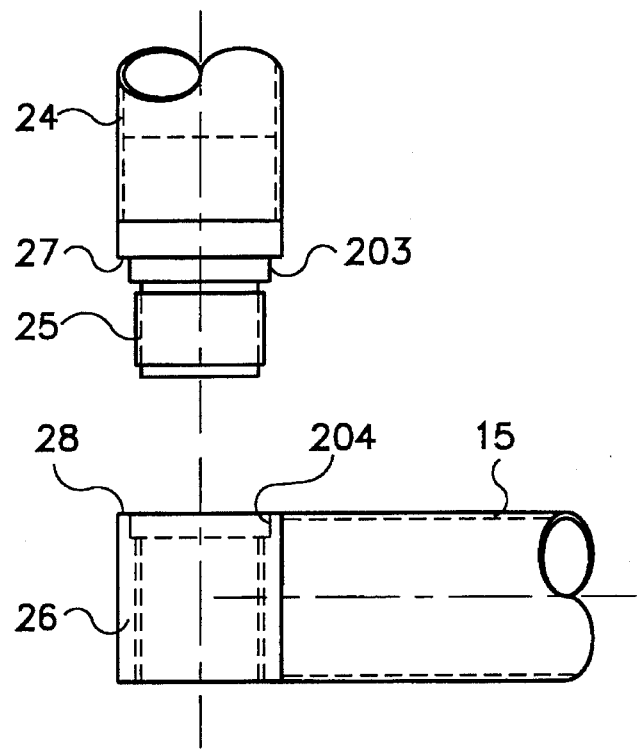
FIG: 3

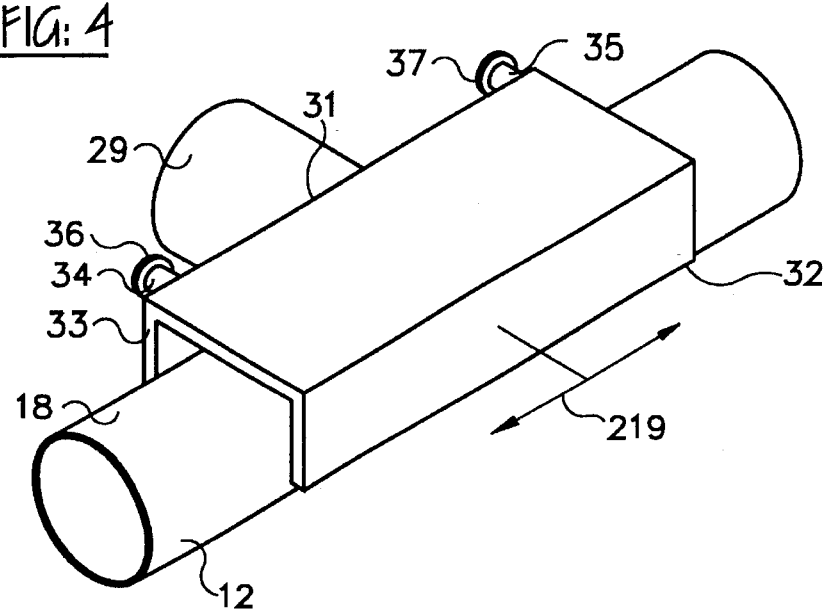
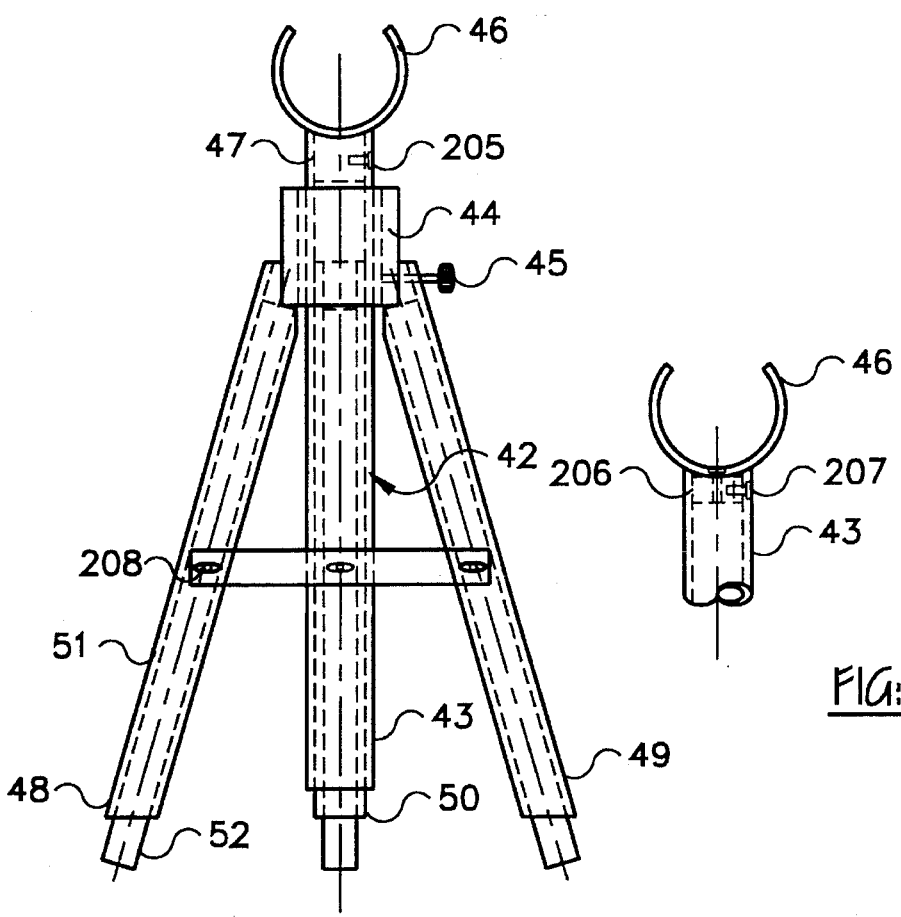

FIG: 11
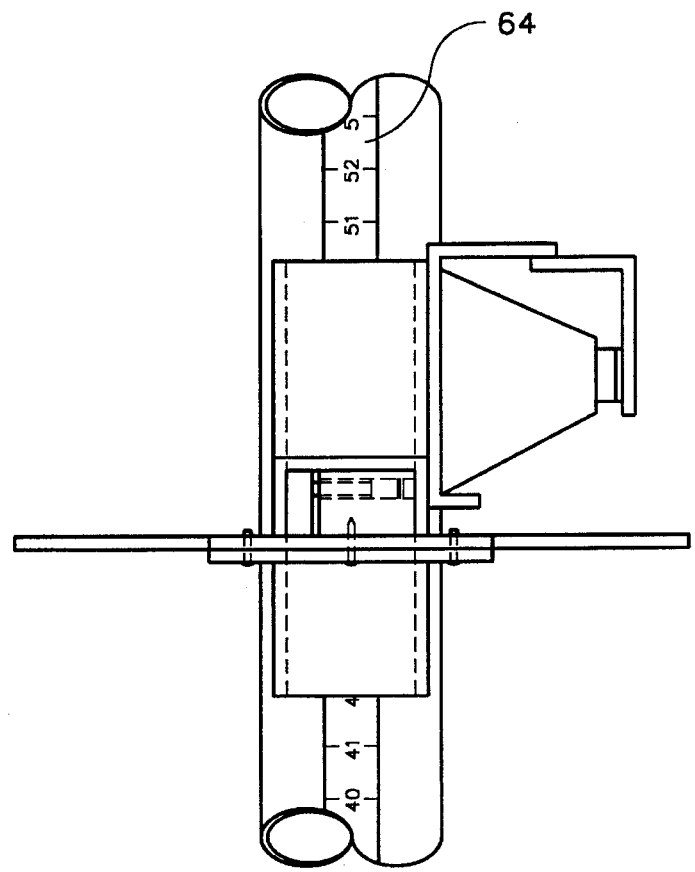
FIG: 12
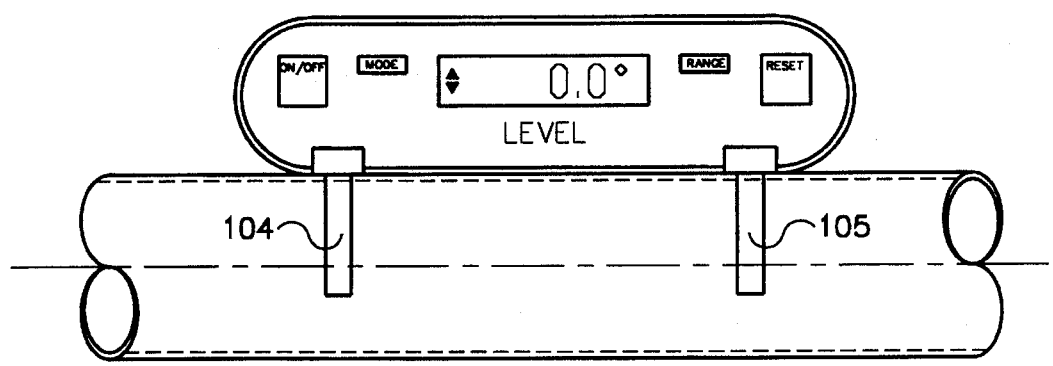

APPARATUS FOR MEASURING THE DEFORMATION OF DAMAGED VEHICLES AND FOR RECONSTRUCTING CRIME SCENES

This is a continuation of U.S. application Ser. No. 03/041,396 filed Mar. 31, 1993 now abandoned.

BACKGROUND OF THE INVENTION

1. Field of the Invention

The present invention relates to a method and apparatus for carrying out easy, fast and accurate three-dimensional measurement of the deformation of damaged vehicles.

2. Brief Description of the Prior Art

Reconstruction is often required to evaluate the causes and circumstances of an accident involving one or many vehicles.

The deformation of the damaged vehicles is one parameter that is scrutinized in this process. The amount of deformation can be one way of assessing severity of the accident but can also be used to calculate velocity change and mean acceleration. Also, the location of the deformation is indicative of, for example, the trajectory of the vehicles upon impact.

Three-dimensional deformation of the damaged vehicles are measured and these data are entered into a computer. The program compares these measurement data to corresponding data of the same non damaged vehicles to reconstruct the accident.

The collection of field data concerning vehicle deformation is, however, time consuming. The deformation measurement is normally taken manually with a low precision and few measurements taken. Need has therefore arisen for less time consuming manual deformation measurement techniques with higher precision.

OBJECT OF THE INVENTION

An object of the present invention is therefore to propose a technique for easily, rapidly and precisely measuring on the site of the accident the deformation of the damaged vehicle(s).

Another object of the present invention is to provide a deformation measuring apparatus enabling the reconstruction of crime scenes.

SUMMARY OF THE INVENTION

More specifically, in accordance with the present invention, there is provided an apparatus for measuring on the site of an accident a three-dimensional deformation of the body of a damaged vehicle, comprising:

a reference frame comprising a first elongated straight frame portion to be installed in the proximity of the deformation of the damaged vehicle, with a known spatial relationship between this first frame portion and a non deformed part of the vehicle body, the first frame portion defining a first axis of a first three-dimensional coordinate system; and a device for measuring distances between the first frame portion and the body of the damaged vehicle in the region of the three-dimensional deformation, by measuring distances along second and third axes of the first three-dimensional coordinate system.

In accordance with preferred embodiments of the apparatus according to the present invention, (a) the body of the damaged vehicle defining a second three-dimensional coordinate system, the first straight frame portion is to be installed parallel to a first axis of that second coordinate system, and (b) the reference frame comprises a second elongated straight frame portion to be installed parallel to a second axis of the second coordinate system, coplanar with the first frame portion.

Also in accordance with the present invention, there is provided a method of measuring on the site of an accident a three-dimensional deformation of the body of a damaged vehicle, comprising the steps of:

installing a first elongated straight frame portion of a reference frame in the proximity of the deformation of the damaged vehicle, with a known spatial relationship between this first frame portion and a non deformed part of the vehicle body, the straight frame portion defining a first axis of a first three-dimensional coordinate system; and measuring distances between the first frame portion and the body of the vehicle in the region of the three-dimensional deformation, by measuring distances along second and third axes of the first coordinate system.

According to preferred embodiments of the method of the invention, (a) the body of the damaged vehicle defining a second three-dimensional coordinate system, the first elongated straight frame portion is to be installed parallel to a first axis of that second coordinate system, (b) the method comprises (i) the step of installing a second elongated straight frame portion of the reference frame parallel to a second axis of the second coordinate system, and measuring a slope of that second frame portion, (ii) the step of measuring the position of the first elongated straight frame portion with respect to a non deformed reference point of the vehicle's body, and (iii) the step of measuring the height of the first elongated straight frame portion above the ground.

The objects, advantages and other features of the present invention will become more apparent upon reading of the following non restrictive description of a preferred embodiment thereof, given by way of example only with reference to the accompanying drawings.

BRIEF DESCRIPTION OF THE DRAWINGS

In the appended drawings:

FIG. 2a shows a first method of assembling tube sections of the reference frame of FIG. 1 end to end;

FIG. 2b shows a second method of assembling tube sections of the reference frame of FIG. 1 end to end;

FIG. 3 shows a first method of assembling tube sections of the reference frame of FIG. 1 perpendicular to each other;

FIG. 4 shows a second method of assembling tube sections of the reference frame of FIG. 1 perpendicular to each other;

FIG. 5 is a side elevational view of a tripod used to support the reference frame at a given height above the ground, the tripod comprising a clip to grasp a tube section of the reference frame and the clip being mounted on the tripod according to a first method;

FIG. 6 is a side elevational view of the clip of FIG. 5 mounted on the tripod according to a second method;

FIG. 11 is a top plan view showing the measuring tape of FIG. 7 installed on the reference frame for measuring the position of the first elongated measuring member on that reference frame.

FIG. 12 is a side elevational view illustrating another application of the apparatus according to the present invention.

DETAILED DESCRIPTION OF THE PREFERRED EMBODIMENT

Figure 1:
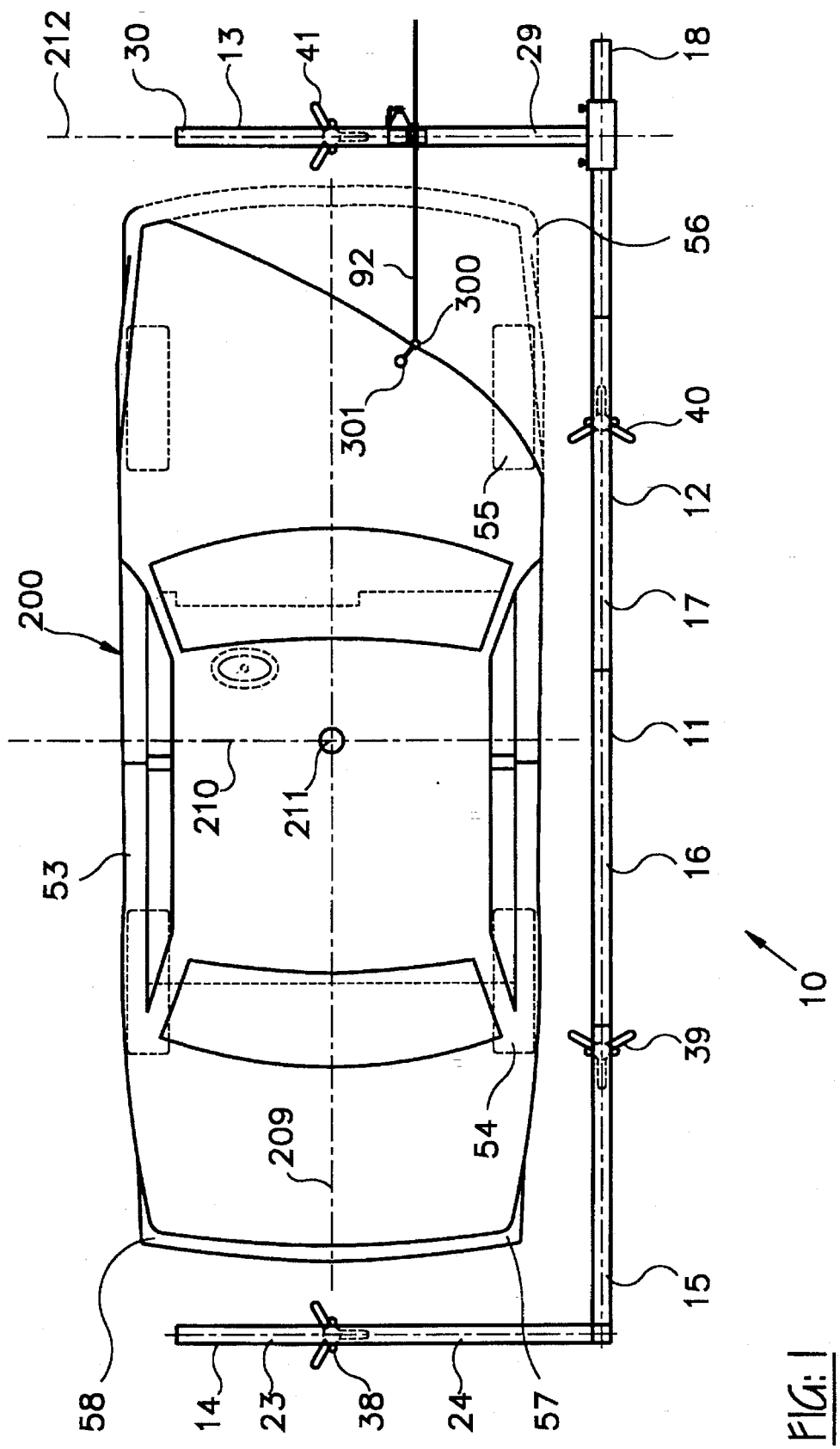
FIG. 1 is a top plan view of an apparatus according to the present invention for carrying out three-dimensional measurement of the deformation of damaged vehicles, comprising a reference frame formed of interconnected tube sections.

The apparatus according to the invention, for measuring deformations of damaged vehicles is generally identified by the reference 10 in FIG. 1 of the appended drawings.

The apparatus 10 first comprises a reference frame 11 installed in the proximity of the body 53 of the damaged vehicle 200 to establish a first three-dimensional coordinate system. In the preferred embodiment of the invention, the frame 11 comprises a longitudinal, elongated straight frame portion 12, a first transversal, elongated straight frame portion 13, and a second transversal, elongated straight frame portion 14.

A plurality of tube sections 15–18, having a circular cross section and made of aluminum, are assembled end to end to form the elongated frame portion 12. FIGS. 2a and 2b show how the tube sections 15 and 16 are connected together. Referring to FIG. 2a, the tube section 15 is formed with an externally threaded end 19 of smaller diameter. Tube section 16 comprises an internally threaded tubular end 20 in which the externally threaded end 19 can be screwed to connect the tube sections 15 and 16 end to end. When the end 19 is screwed into the end 20, an annular flat surface 21 of tube section 15 abuts against a corresponding annular flat surface 22 of tube section 16 to align the tube sections 15 and 16 with each other. Tube section 15 further comprises a shoulder 201 which fits in a counter bore 202 of tube section 16 to center the aligned tube sections 15 and 16 on the same longitudinal axis.

In FIG. 2b, the externally threaded end 19' of smaller diameter of tube section 15 is conical. The internally threaded tubular end 20' of tube section 16 is also conical whereby the conical threaded end 19' can be screwed therein to connect the tube sections 15 and 16 end to end. When the end 19' is screwed into the end 20' the annular flat surface 21' of tube section 15 still abuts against the corresponding annular flat surface 22' of tube section 16 to align the tube sections 15 and 16 with each other. Tube section 15 again comprises the shoulder 201' which fits in the counter bore 202' of tube section 16 to center the aligned tube sections 15 and 16 on the same longitudinal axis.

The advantage of the conical threaded ends 19' and 20' is that the assembly of tube sections 15 and 16 is faster.

Obviously, the pair of tube sections 16 and 17 as well as the pair of tube sections 17 and 18 are assembled end to end as described hereinabove in relation to FIGS. 2a and 2b and tube sections 15 and 16.

The transversal frame portion 14 is formed of a pair of tube sections 23 and 24, circular in cross section and made of aluminum. Tube sections 23 and 24 are assembled end to end as described in FIGS. 2a and 2b with reference to tube sections 15 and 16.

The proximate end 25 of tube section 24 is, as illustrated in FIG. 3, of smaller diameter and externally threaded. The corresponding end of the tube section 15 is formed with a transversal, internally threaded tubular element 26 in which the threaded end 25 can be screwed to connect tube section 24 perpendicular to tube section 15. When the end 25 of tube section 24 is screwed into the tubular element 26, an annular flat surface 27 of tube section 24 abuts against a corresponding annular flat surface 28 of tubular element 26 to orient the frame portion 14 perpendicular to the frame portion 12. Tube portion 24 is formed with a shoulder 203 that fits into a counter bore 204 of the tubular element 26 to make these tube portion 24 and tubular element 26 coaxial.

The transversal frame portion 13 also includes of a pair of tube sections 29 and 30, circular in cross section and made of aluminum. Tube sections 29 and 30 are assembled end to end as described in FIGS. 2a and 2b in relation to tube sections 15 and 16.

As illustrated in FIG. 4, the proximate end 31 of tube section 29 is welded perpendicular to a channel section 32, made of aluminum. More specifically, the end 31 of tube section 29 is welded or threaded perpendicular to the outer face of a side wall 33 of the channel section 32. The U-shaped cross section of the channel 32 is reversed whereby it can be placed on the frame portion 12, more specifically on the tube section 18. When the frame portion 13 has been appropriately positioned, a pair of thumbscrews 34 and 35, having respective knurled heads 36 and 37, are screwed in threaded holes (not shown) of the side wall 33 until their free ends (not shown) apply a pressure to the outer surface of the tube section 18 through a small aluminum plate (not shown) to prevent tube section 18 to be damaged by the screws 34 and 35. Frame portion 13 is then mounted on frame portion 12.

As can be appreciated, frame portion 13 can be easily displaced along frame portion 12 by unscrewing the thumbscrews 34 and 35, displacing the channel section 32 along frame portion 12 (see arrows 219) and tightening the screws 34 and 35.

Frame portions 12, 13 and 14 are supported above the ground by means of tripods 38, 39, 40 and 41 (FIG. 1). As illustrated in FIG. 5, each tripod 38–41 comprises a telescopic central column 42 comprising a vertical tube section 43 sliding into a sleeve 44. When the longitudinal position of the tube section 43 has been adjusted, it is blocked in the sleeve 44 by means of a thumbscrew 45. The upper end of the tube section 43 is provided with a generally semicircular frame grasping clip 46, made of A.B.S. (acrylonitrile butadiene styrene) or of high density molecular plastic. Clip 46 includes a cylindrical extension 47 inserted in the upper end of tube section 43 and blocked therein by means of a screw 205, driven in a hole of tube section 43. Clip 46 is flexible to grasp any tube section 15–18, 23–24, or 29–30. As can be easily appreciated by one of ordinary skill in the art, the clips 46 enable fast mounting and withdrawal of the frame 11 on and from the tripods 38–41.

As illustrated in FIG. 6, the semicircular clip 46 is attached to the upper end of the tube section 43 by means of a rivet 206. For that purpose a small circular disk or plate 207 is welded or otherwise fixed in the tube section 43 to receive the rivet 206.

The height of the frame 11 can be adjusted by sliding longitudinally the tube section 43 in the sleeve 44 and then locking the tube section 43 in the sleeve 44 through screwing of thumbscrew 45. Each tripod 38–41 also comprises three telescopic legs 48, 49 and 50 to carry out this function. Each telescopic leg comprises an outer tube section such as 51 and an inner rod such as 52 sliding in the tube section 51 and that can be blocked in the tube section 51 by means of a thumbscrew such as 208. The telescopic legs 48, 49 and 50 also enable to install the tripods 38–41 vertical on an uneven ground.

The longitudinal frame portion 12 is installed parallel to the longitudinal axis 209 of the damaged vehicle 200, of which the three-dimensional deformation is to be measured. The vehicle body 53 also defines a transversal axis 210 and a vertical axis 211 forming with longitudinal axis 209 a second, three-dimensional coordinate system of the vehicle 200. To place the frame portion 12 parallel to the longitudinal axis 209, frame portion 12 is first positioned parallel to the vertical plane of symmetry of the vehicle 200, including the longitudinal axis 209. This can be made by measuring distances between frame portion 12 and a non deformed part of vehicle 200. When at least one tire of the vehicle is flat, frame portion is then centered on the rear 54 and front 55 wheels on the right side of the vehicle 200 (see the example of FIG. 1). When all the tires of the vehicle are inflated, the inclination of the ground can be measured and the same inclination given to the longitudinal frame portion 12. The transversal frame portions 13 and 14 are then oriented parallel to the transversal axis 210 of the vehicle 200. Other methods can obviously be contemplated to position adequately the frame portions 12, 13 and 14 parallel to the axis 209 and 210. Of course, the height of the frame portions 12–14 is adjusted by means of the tripods 38–41.

In the case of a deformation at the front right corner 56 of the body 53 of the vehicle 200, the frame 11 is placed so as to provide a non deformed reference point of the body 53, such as the rear right corner 57 of the vehicle 200. The measurements of deformation will be made from this reference point, as described hereinbelow.

Tripod 38 can be eliminated and the transversal frame portion 14 attached to the bumper 58 of the vehicle 200. The reference point is then the rearmost point of the vehicle 200.

Figure 7:
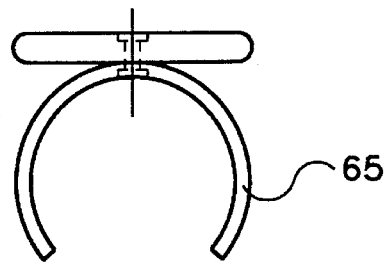
FIG. 7 is a cross sectional view of a measuring tape that can be installed on the reference frame.

The apparatus according to the invention further comprises a measuring tape 64 (FIGS. 7 and 11), made of fiberglass material, and provided with underneath semicircular PVC clips such as 65 distributed along the tape 64. Tape 64 is mounted on the tubular frame portion 12 by means of the clips 65 to measure the distance between the rear reference point and the longitudinal axis of the transverse frame portion 13, defining a first axis 212 (FIG. 1) of the above mentioned second three-dimensional reference system. The tape 64 is then installed on the transversal frame portion 13, as schematically shown in FIGS. 1 and 11, to be used upon measurement of the deformation of the front right corner 56 of the vehicle's body 53.

FIGS. 8–11 illustrate the device, used in combination with the transversal frame portion 13, to measure the deformation of the right front corner 56.

Figure 8:
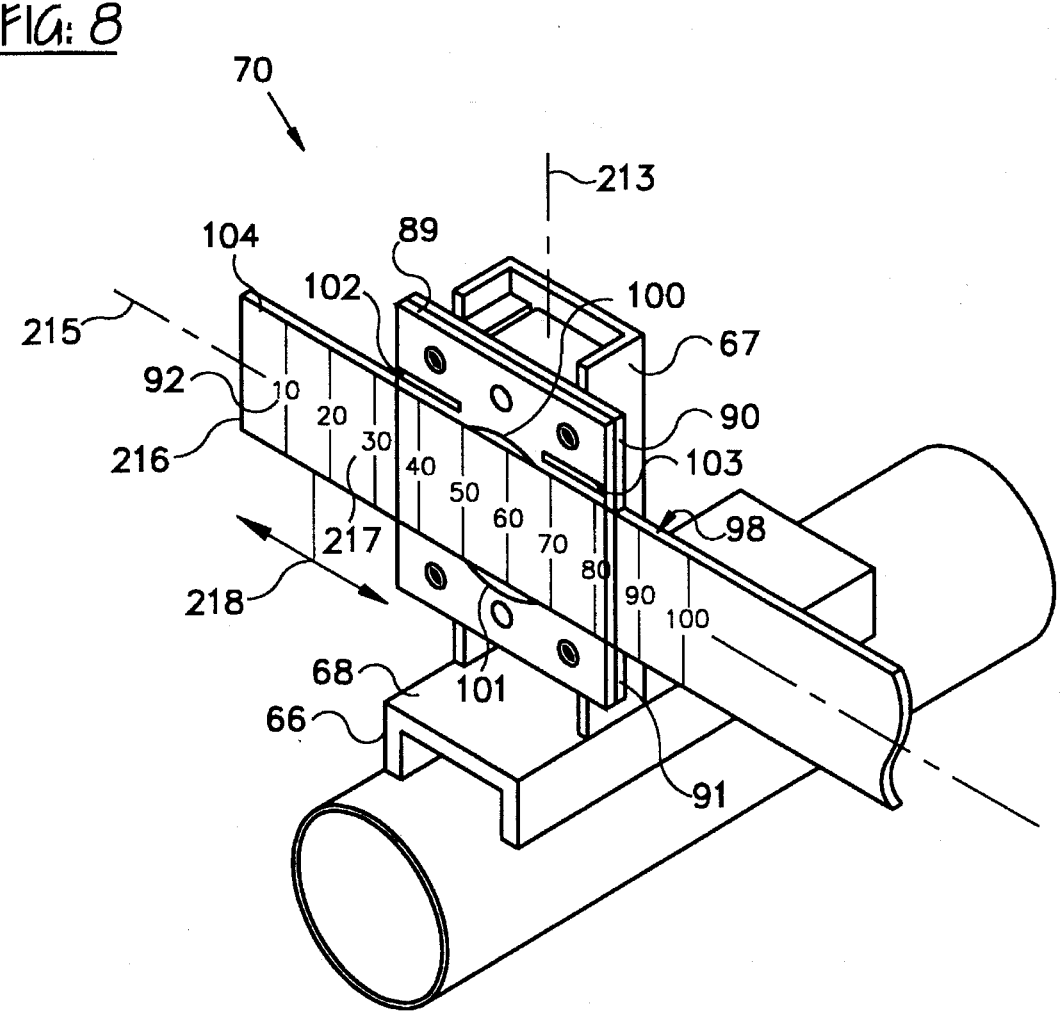
FIG. 8 is a perspective view of first and second elongated measuring members for measuring distances between the reference frame and the damaged vehicle.
Figure 9:
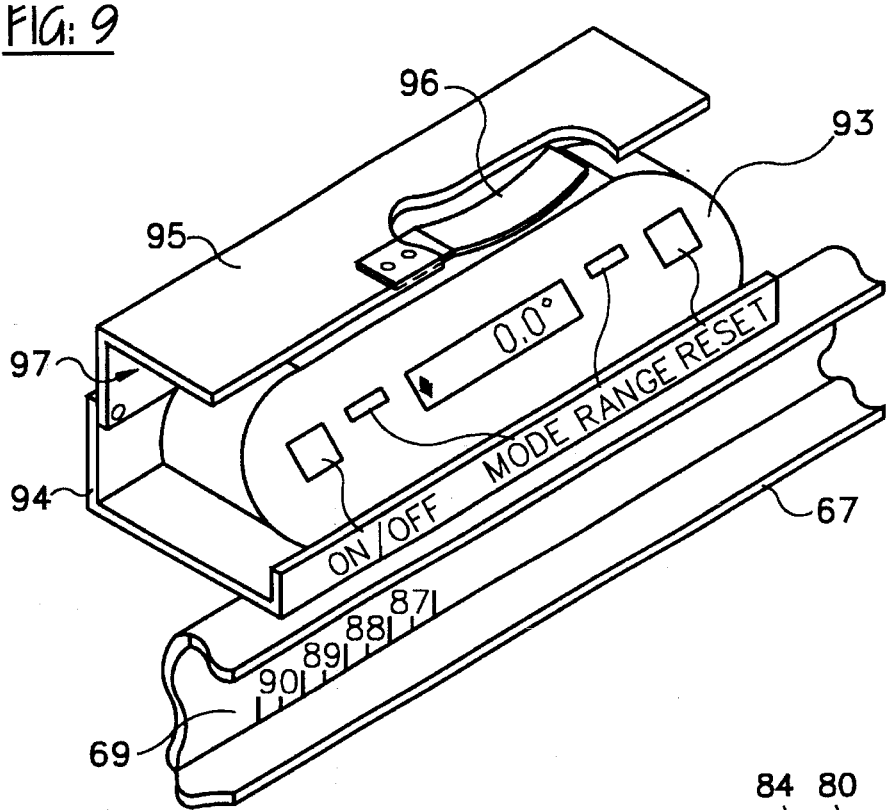
FIG. 9 is a perspective view of a digital level mounted on the first elongated measuring member of FIG. 8.

As illustrated in FIG. 8, this deformation measuring device first comprises an inverted channel section 66, made of aluminum and placed on the transversal frame portion 13 whereby that channel section 66 will guide the deformation measuring device along that channel section.

The lower end of another channel section 67, also made of aluminum, is welded perpendicular to the top surface 68 of the channel section 66. Although the channel sections 66 and 67 are perpendicular to each other, the width of channel section 67 is oriented in the same direction as the width of channel section 66. The bottom of channel section 67 is graduated (see 69 in FIG. 9) for the purpose of measuring the vehicle's deformation. The channel section 67 defines a second axis 213 of the second three dimensional reference system.

A digital level 93 is mounted at the upper end of the channel section 67 by means of an aluminum channel section 94 and an angular aluminum member 95 welded together and to the channel section 67 to form a seat 97 for the level 93. A spring member 96, made of A.B.S. (acrylonitrile butadiene styrene) or of high density molecular plastic, enables longitudinal sliding of the digital level 93 in the seat 97 to insert and withdraw that level in and from that seat. However, the pressure applied by the spring member 96 is sufficient to retain the digital level 93 in the seat 97 upon measuring the three-dimensional deformation.

The function of the level 93 is to maintain the axis 213 (FIG. 8) in a vertical plane including the axis 212 (FIG. 1) while measuring the vehicle deformation.

Figure 10:
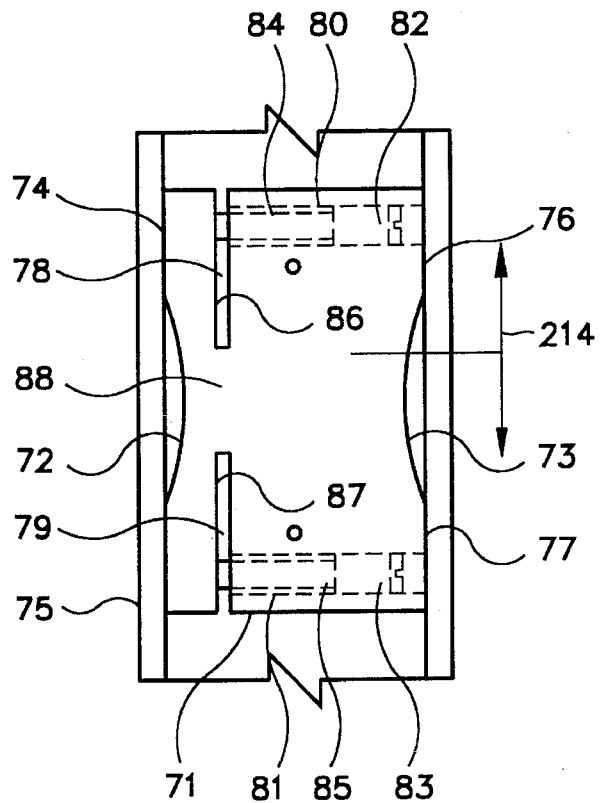
FIG. 10 is a side elevational view of a carrier block sliding along the first elongated measuring member and on which the second elongated measuring member is mounted.

Referring back to FIG. 8, a rule carrier 70 slides into a first elongated measuring member in the form of a channel section 67. As illustrated in FIG. 10, the carrier 70 first comprises a sliding block 71 fitting into the channel section 67. The block 71 comprises concave cuts 72 and 73 whereby only end surfaces 74–77 contact the inner wall surface of the channel section 67. The block 71 further comprises two coplanar deep end slots 78 and 79 parallel and closer to the block surfaces 74 and 75, respectively. A first hole 80 interconnects block surface 76 with the slot 78, and a second hole 81 interconnects block surface 77 with the slot 79. Holes 80 and 81 are threaded to receive threaded bolts 82 and 83, respectively. It is important that the threaded bolts 82 and 83 be completely inserted in the holes 80 and 81 to cause no interference upon sliding of the surfaces 76 and 77 on the inner wall surface of the channel section 67.

A rubber rod 84 is introduced in hole 80 between the threaded bolt 82 and face 86 of the slot 78. In the same manner, a rubber rod 85 is inserted in hole 81 between the threaded bolt 83 and face 87 of the slot 79. Adequate adjustment of the threaded bolts 82 and 83 in the holes 80 and 81 will cause the rubber rod 84 to produce a spring force to apply with a given pressure sliding surfaces 74 and 76 to the inner surface of the channel section 67. This will also compress the rubber rod 85 to generate a spring force applying pressure on the sliding surfaces 75 and 77 of the block 71 to the inner surface of the channel section 67. The pressure generated by the rubber rods 84 and 85 enables easy upward and downward movement (see arrows 214) of the block 71 in the channel section 67 but will be sufficient to retain the block in place upon measuring the three-dimensional deformation.

Bolted to the exposed front face 88 of the block 71 is a transparent plastic front plate 89 (FIG. 8). Horizontal upper and lower plastic bars 90 and 91 are interposed between the front plate 89 and the front surface 88 of the block 71 to define between these plate 89 and block 71 a passage 98 in which a graduated rule 92 is capable of sliding (see arrows 218). As can be seen in FIG. 8, the lower and upper bars 90 and 91 include concave cuts 100 and 101, respectively, to reduce friction between the edges of the rule 92 and the bars 90 and 91. A pair of slots 102 and 103 are further cut in the upper bar 90 to produce a spring action applying pressure to the upper edge 104 of the rule 92. This pressure enables longitudinal sliding of the rule 92 in the passage 98, but produces a retaining friction on rule 92 to prevent or reduce undesired movement of that rule.

The rule 92 is therefore perpendicular to the channel section 67 and defines the third axis 215 of the second three-dimensional coordinate system.

To measure the three-dimensional deformation of the front right corner 56 of the vehicle body 53, frame portions 12, 13 and 14 are first installed following the above described procedure.

The reference point (for example the right rear corner 57 of the damaged vehicle 200) for the deformation measurement is established. It is important that the reference point corresponds to a non damaged part of the vehicle body 53.

Rule 92 (FIG. 8) is withdrawn from its passage 98 and the vertical distance, along axis 211 of the vehicle 200, between this reference point of the vehicle body 53 and the longitudinal and central axes of the frame portion 12, 13 and 14 is measured using this rule 92. Rule 92, withdrawn from its passage 98, is also used to measure the distance parallel to the transversal axis 210 (FIG. 1) between the reference point and the longitudinal axis of the frame portion 12.

Measuring tape 64 (FIG. 11) is then installed on frame portion 12 by means of the clips 65, and the longitudinal distance between the reference point and the axis 212 (FIG. 1) of the frame portion 13 is measured.

Tape 64 is then displaced onto the frame portion 13 by means of the clips 65. The tape 64 is positioned on the frame portion 13 so that the measurement of the position of the channel section 66 along that frame portion 13 is taken relative to the reference point.

The channel section 66 is then placed on the frame portion 13 as illustrated in FIG. 8 and the position of that channel section 66 is determined by means of the tape 64. The carrier 70 is displaced vertically along the channel section 67 and the distance between the axis 215 and the axis 212 of the second coordinate system is measured by means of the graduations 69, these graduations 69 being positioned on the channel section 67 for that purpose. The channel section 67 is positioned in a vertical plane passing through the axis 212 defined by the frame portion 13 by means of the digital level 93 mounted in the seat 97. The rule 92 is finally displaced longitudinally in the passage 98 until end 216 (FIG. 8) is in contact with the damaged region of the body 53 of the vehicle 200 (see FIG. 1). The graduations 217 on the rule 92 are designed for measuring the distance between the axis 213 (FIG. 8) and the damaged region of the vehicle body 53. The operations described in this paragraph are repeated to cover all the damaged region of the vehicle 200.

The measurement data are entered in a computer programmed to reconstruct the accident as discussed in the preamble of the present specification. One skilled in the art will appreciate that the above described measurements will enable the computer to transpose the deformation from the second three-dimensional coordinate system (axes 212, 213 and 215) in the first three-dimensional coordinate system (axes 209, 210 and 211). For that purpose, the computer must know the dimensional characteristics of a non damaged vehicle identical to vehicle 200. This processing forms no part of the invention and will not be further described.

Although three-dimensional deformation of the front right corner 56 is measured in the illustrated example, one of ordinary skill in the art will appreciate that the apparatus 10 according to the present invention can be displaced around the vehicle 200 to measure a three-dimensional deformation of any portion of the body 53.

Preferably, all the elements of the apparatus according to the invention are made of materials resisting to corrosion.

When the transversal frame portions 13 and 14 are dismantled, elongated frame portion 12 can be used to measure the slope of the ground on the site of the accident. For that purpose, the digital level 93 is withdrawn from its seat 97 and is attached to the frame portion 12 by means for example of screws 104 and 105 (see FIG. 12). This can be used for example during installation of the reference frame 11, to adjust the slope of frame portion 12 to that of the ground, as described hereinabove.

Elongated frame portion 12 can also be used as a pole to help a person in difficulties, for example a person who fell into the water.

Moreover, a two- or three-dimensional angle measuring device 300 (FIG. 1), attached to the end of rule 92 shall measure the angle of a bullet hole 301 in the body 53 of the vehicle 200 to enable to determine the trajectory and origin of the bullet.

Therefore, the apparatus in accordance with the present invention has at least four applications.

Although the present invention has been described hereinabove by way of a preferred embodiment thereof, this embodiment can be modified at will, within the scope of the appended claims, without departing from the spirit and nature of the subject invention. For example, the apparatus 10 can be used to measure deformations of damaged vehicles other than automobiles.

The embodiments of the invention in which an exclusive property or privilege is claimed are defined as follows:

1. A deformation measuring apparatus for measuring on the site of an accident a three-dimensional deformation of the body of a damaged vehicle, comprising:

an elongated straight reference frame member to be installed in the proximity of the deformation of the damaged vehicle, with a known spatial relationship between said reference frame member and a non deformed part of said vehicle body, said reference frame member defining a first axis of a first three-dimensional coordinate system; and a device for measuring distances between said reference frame member and the body of the damaged vehicle in the region of said three-dimensional deformation, by measuring distances along second and third axes of said first three-dimensional coordinate system; and wherein said distance measuring device comprises:

a first elongated measuring member for measuring distances along said second axis of the first three-dimensional coordinate system;

means for mounting said first elongated measuring member perpendicular to said reference frame member while enabling displacement of the first elongated measuring member along the reference frame member and rotation of said first elongated measuring member about said reference frame member;

means for measuring the position of said first elongated measuring member along said reference frame member;

a second elongated measuring member for measuring distances along said third axis of the first coordinate system;

means for mounting said second elongated measuring member perpendicular to both the first elongated measuring member and the reference frame member while enabling displacement of the second elongated measuring member along the first elongated measuring member and longitudinal sliding of the second elongated measuring member on said first elongated measuring member; and a level means adapted for attachment to said first elongated measuring member for positioning said first elongated measuring member in a given angular position about said first axis by rotating said first elongated measuring member about the reference frame member prior to measuring distances between the reference frame member and the vehicle's body by means of the first and second elongated measuring members.

2. A deformation measuring apparatus as recited in claim 1, wherein said body of the damaged vehicle defines a second three-dimensional coordinate system, and wherein said reference frame member is to be installed parallel to a first axis of said second coordinate system.

3. A deformation measuring apparatus as recited in claim 1, comprising means for supporting the reference frame member above the ground and means for adjusting the height of said reference frame member above the ground.

4. A deformation measuring apparatus as recited in claim 1, comprising means for measuring the position of said reference frame member with respect to a non deformed reference point of the body of said damaged vehicle.

5. A deformation measuring apparatus as recited in claim 1, comprising means for measuring a slope of said reference frame member.

6. A deformation measuring apparatus as recited in claim 1, in which said second elongated measuring member comprises a rule perpendicular to both the first elongated measuring member and the reference frame member.

7. A deformation measuring apparatus as recited in claim 6, wherein said rule comprises a free end, and wherein an angle measuring device is mounted on the free end of said rule to measure the angular orientation of a bullet hole in the vehicle body to thereby determine the trajectory and origin of a bullet having made said hole.

* * * * *